United States Patent
Gatson et al.

(10) Patent No.: US 12,061,931 B2
(45) Date of Patent: Aug. 13, 2024

(54) OPTIMIZING PERFORMANCE OF A COMPUTING DEVICE IN A MIXED WORKLOAD ENVIRONMENT

(71) Applicant: Dell Products L.P., Round Rock, TX (US)

(72) Inventors: Michael S. Gatson, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 17/391,964

(22) Filed: Aug. 2, 2021

(65) Prior Publication Data

US 2023/0029920 A1    Feb. 2, 2023

(51) Int. Cl.
*G06F 9/50* (2006.01)
*G06N 20/00* (2019.01)

(52) U.S. Cl.
CPC .......... *G06F 9/5027* (2013.01); *G06N 20/00* (2019.01)

(58) Field of Classification Search
CPC ......... G06F 9/5027; G06F 2009/45591; G06F 1/3228; G06F 1/3287; G06F 9/45558; G06F 2209/508; G06F 9/5077; G06N 20/00
See application file for complete search history.

(56) References Cited

U.S. PATENT DOCUMENTS

| | | | |
|---|---|---|---|
| 9,088,592 B1 * | 7/2015 | Craft | H04L 67/1097 |
| 2014/0250164 A1 * | 9/2014 | Marx | G06F 16/951 |
| | | | 709/203 |
| 2015/0249675 A1 * | 9/2015 | Yeung | H04L 67/56 |
| | | | 709/219 |
| 2017/0017689 A1 * | 1/2017 | Scheibli | G06F 16/2453 |
| 2020/0034530 A1 * | 1/2020 | Zasadzinski | G06F 21/554 |
| 2020/0090001 A1 * | 3/2020 | Zargahi | G06F 18/217 |
| 2020/0228433 A1 * | 7/2020 | Lee | H04L 43/16 |
| 2022/0131852 A1 * | 4/2022 | Sharma | H04L 63/0815 |

FOREIGN PATENT DOCUMENTS

| | | | |
|---|---|---|---|
| CN | 110351754 A | * | 10/2019 |
| CN | 110716763 A | * | 1/2020 |

OTHER PUBLICATIONS

Hu, CN110716763A Description Translation, Jan. 21, 2020, https://worldwide.espacenet.com/publication Details/description?CC=CN&NR=110716763A&KC=A&FT=D&ND=3&date=20200121&DB=&locale=en_EP, pp. 1-22 (Year: 2020).*

Li et al. CN110351754A Description Translation, Oct. 18, 2019, https://worldwide.espacenet.com/publicationDetails/description?CC=CN&NR=110351754A&KC=A&FT=D&ND=3&date=20191018&DB=&locale=en_EP, pp. 1-14 (Year: 2019).*

* cited by examiner

*Primary Examiner* — Meng Ai T An
*Assistant Examiner* — Hsing Chun Lin
(74) *Attorney, Agent, or Firm* — Kirton McConkie; Brian Tucker (57) ABSTRACT

Performance of a computing device can be optimized in a mixed workload environment. A management service can be configured to capture telemetry data from web applications or containerized applications and use such telemetry data to detect a scenario. Based on the detected scenario, the management service can select optimized performance settings and cause the optimized performance settings to be applied within the browser or container in which the application is deployed. Machine learning techniques can be employed to detect and define optimized performance settings for a particular scenario.

17 Claims, 8 Drawing Sheets

OPTIMIZING PERFORMANCE OF A COMPUTING DEVICE IN A MIXED WORKLOAD ENVIRONMENT

CROSS-REFERENCE TO RELATED APPLICATIONS

N/A

BACKGROUND

Figure 1:
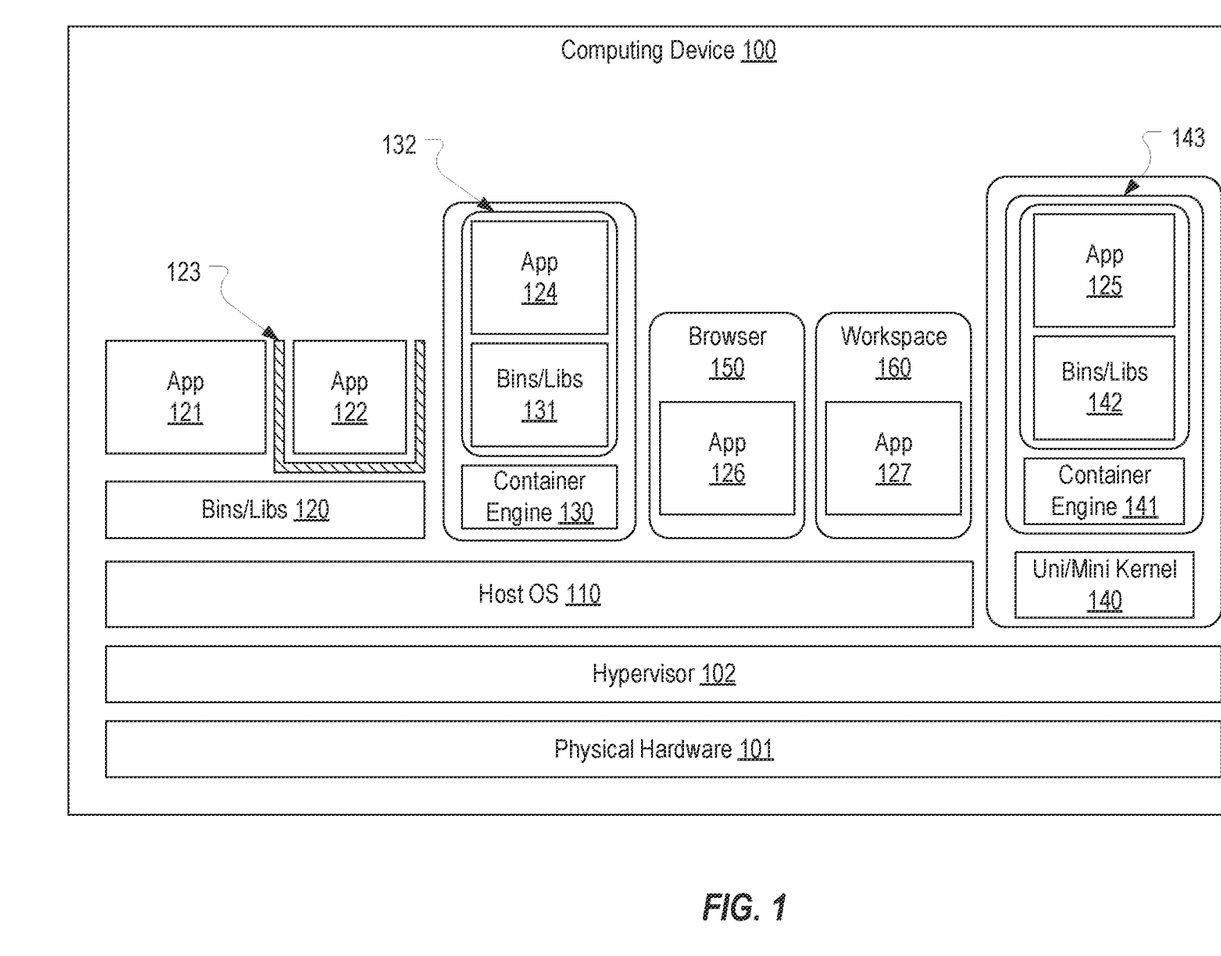
FIG. 1 provides an example of a computing device that has mixed workload environment.

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized (i.e., a native application) in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Application 124 is an example of an application that is executed in a second type of container in which containerization is implemented using software virtualization. Examples of solutions that implement containerization through software virtualization (or "software containers") include Docker and FreeBSD Jails. As represented in FIG. 1, application 124 and its binaries/libraries 131 may be isolated within its own container 132 that is executed via a container engine 130 that runs on host operating system 110. Variations of this second type of container include Intel Software Guard Extensions (SGX) and Arm TrustZone which containerize an application within a secure region of memory.

Application 125 is an example of an application that is executed in a third type of container in which containerization is implemented using hardware virtualization. Examples of solutions that implement containerization through hardware virtualization (or "hardware containers") include Kata Containers, Hyper-V Docker and Qubes OS. As represented in FIG. 1, with hardware containers, a uni/mini kernel 140 may be executed on hypervisor 102. A container engine 141 can then be run on uni/mini kernel 140 to containerize application 125 and its binaries/libraries 142.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization (e.g., via a unikernel). Accordingly, there is a wide variety of container modes for executing an application.

The use of web applications is another technique that is commonly used to isolate applications from the host operating system and environment. Application 126 is an example of a web application that is hosted on computing device 100 within browser 150. Examples of web applications include the Office 365 applications.

Virtual desktop infrastructure techniques may also be used to isolate applications from the host operating system and environment. Amazon Workspaces and Azure Virtual Desktops are examples of such VDI-based solutions that provide "workspaces" for hosting applications. Application 127 is an example of an application that is hosted in a workspace 160.

Various solutions exist for optimizing the performance of a computing device. Some of these solutions attempt to tune the performance for a particular application or set of applications that may be running on a computing device. However, when containerized applications, web applications and/or workspace-hosted applications are deployed, possibly in conjunction with native applications (or a "mixed workload environment"), such solutions will be isolated from the applications and will therefore be incapable of optimizing performance for the applications.

BRIEF SUMMARY

The present invention extends to systems, methods and computer program products for optimizing performance of a computing device in a mixed workload environment. A management service can be configured to capture telemetry data from web applications, containerized applications and/or workspace-hosted applications and use such telemetry data to detect a scenario. Based on the detected scenario, the management service can select optimized performance settings and cause the optimized performance settings to be applied within the browser, container or workspace in which the application is deployed. Machine learning techniques can be employed to detect and define optimized performance settings for a particular scenario.

In some embodiments, the present invention may be implemented as a method for optimizing performance of a computing device in a mixed workload environment. A management service executing outside a browser can receive telemetry data from a service that is hosted in the browser. The telemetry data pertains to a web application that is deployed in the browser. The management service can process the telemetry data to detect a scenario. The management service can then select optimized performance settings for the scenario. The management service can also provide the optimized performance settings to the service to cause the service to apply the optimized performance setting in the browser to thereby optimize performance of the web application.

In some embodiments, the present invention may be implemented as computer storage media storing computer executable instructions which when executed on a computing device implement a method for optimizing performance of a computing device in a mixed workload environment. Telemetry data for a web application that is deployed in a browser can be captured. Additional telemetry data can be captured outside the browser. Optimized performance settings can be selected based on the telemetry data and the additional telemetry data. The optimized performance settings can then be applied to thereby optimize performance of the web application.

In some embodiments, the present invention may be implemented as a computing device having a CPU and computer storage media storing computer executable instructions which when executed by the CPU implement a method for applying optimized performance settings while a web application is deployed in a browser. A management service running outside the browser can receive telemetry data for the web application that was captured inside the browser. The management service can select optimized performance settings based on the telemetry data. The management service can apply the optimized performance settings inside the browser to thereby optimize performance of the web application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "mixed workload environment" will be used to reference an environment where applications may be deployed on a computing device as a mix of native applications, containerized applications, web applications or workspace-hosted applications. The term "container" should be construed as encompassing any type of container, including but not limited to those described in the background. For example, an application may be containerized in a software container such as a Docker container or a hardware container such as a Kata container. The term "workspace" should be construed as encompassing any VDI-based solution in which an application can be hosted. For example, an application may be hosted in an Amazon Workspace or an Azure Virtual Desktop. Embodiments of the present invention enable the performance of the computing device to be optimized for one or more applications that are currently deployed in spite of the fact that they may be deployed as some mix of native, containerized, web and workspace-hosted applications.

Although the description may employ Windows-based examples and terminology, embodiments of the present invention should not be construed as being limited to implementation on Windows-based computing devices. To the contrary, other operating systems (e.g., Android and Linux) include components that are functionally similar or equivalent to the Windows-based components described herein. Therefore, the techniques described herein, by which embodiments of the present invention enable the performance of a computing device to be optimized for a mixed workload environment can be implemented in any operating system environment that supports mixed workload environments.

Figure 2:
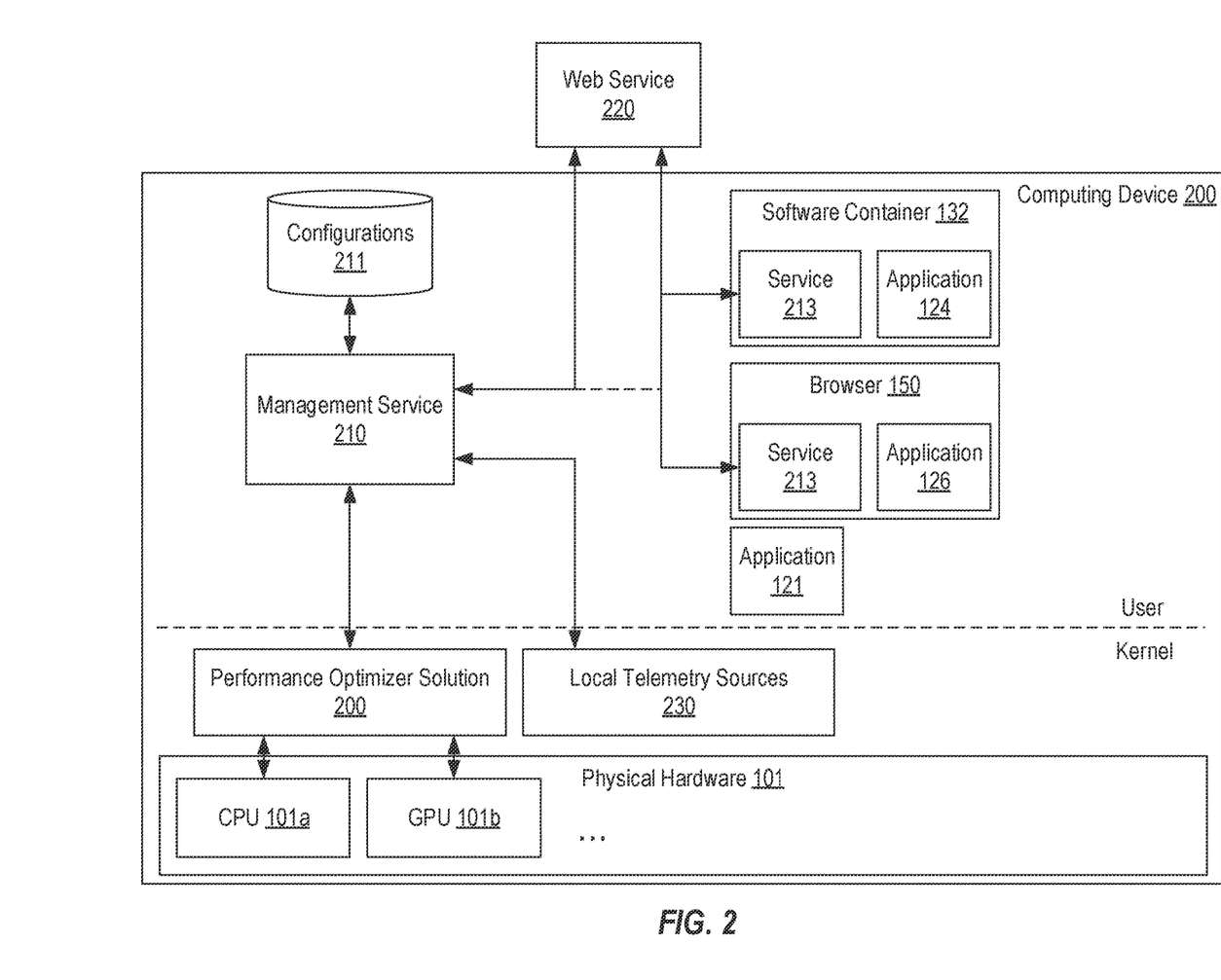
FIG. 2 provides an example of how a computing device may be configured to enable one or more embodiments of the present invention to be implemented.

FIG. 2 provides an example of various components that can be employed on computing device 100 to enable the performance of computing device 100 to be optimized for a mixed workload environment. FIG. 2 is based on FIG. 1 but includes a number of additional components for implementing embodiments of the present invention. As shown, computing device 200 can include physical hardware 101 that may include CPU 101a and GPU 101b, among possibly other hardware that can be optimized for a particular mixed workload environment. Computing device 200 may also include a performance optimizer solution 200 which can represent any component(s) that are configured to interface with CPU 101a, GPU 101b or other physical hardware 101 to adjust their performance settings. For example, performance optimizer solution 200 may be configured to set the number of CPU cores, process priority, hyperthreading, etc. Computing device 200 may also include local telemetry sources 230 which can represent any component that can provide telemetry data for computing device 200. For example, local telemetry sources 230 could include the Dell Data Vault service which leverages telemetry data loaded from the Intel Converged Telemetry Framework.

A management service 210 may also be included on computing device 200 and may be configured to interface with performance optimizer solution 200 to instruct performance optimizer solution 200 to optimize the performance of computing device 200 for a detected scenario in a mixed workload environment. In some embodiments, management service 210 may be a component of performance optimizer solution 200. Management service 210 may employ a configurations database 211 to maintain optimized performance settings for a number of detectable scenarios.

To enable management service 210 to determine the appropriate optimization for a current mixed workload environment, a service 213 can be deployed in each container, browser or workspace that is used to host an application on computing device 200. For example, when application 124 is deployed in software container 132, an instance of service 213 can be deployed in software container 132. Similarly, when application 126 is deployed in browser 150, an instance of service 213 can be deployed in browser 150. Although not shown, an instance of service 213 could also be deployed in any hardware container or workspace in which an application may be deployed.

Management service 210 can be configured to establish a connection with each instance of service 213 that may be deployed on computing device 200. In some embodiments, a web service 220 may be employed for this purpose. For example, service 213 and management service 210 may be configured to register with web service 220 which in turn can relay information about each service 213 (e.g., IP address, port, container ID, etc.) to management service 210 to enable management service 210 to securely communicate with each service 213.

As an overview, service 213 can be configured to obtain telemetry data for the respective application running in the container or browser and relay the telemetry data to management service 210. Management service 210 can use the telemetry data received from each service 213 as well as telemetry data obtained from local telemetry sources 230 to detect a particular scenario in the mixed workload environment and may then select optimized performance settings defined for the detected scenario. Management service 210 may then cause the optimized performance settings to be applied on computing device 200. In a scenario involving a web application or containerized application, management service 210 can cause service 213 running in the browser or the container to apply optimized performance settings within the browser or the container. Management service 210 may also interface with performance optimizer solution 200 to apply optimized performance settings. In this way, the performance of computing device 200 can be optimized for the detected scenario even when an application may be isolated in a browser or a container. This process can be repeated as different scenarios are detected to ensure that computing device 200's performance remains optimized.

Figure 3:
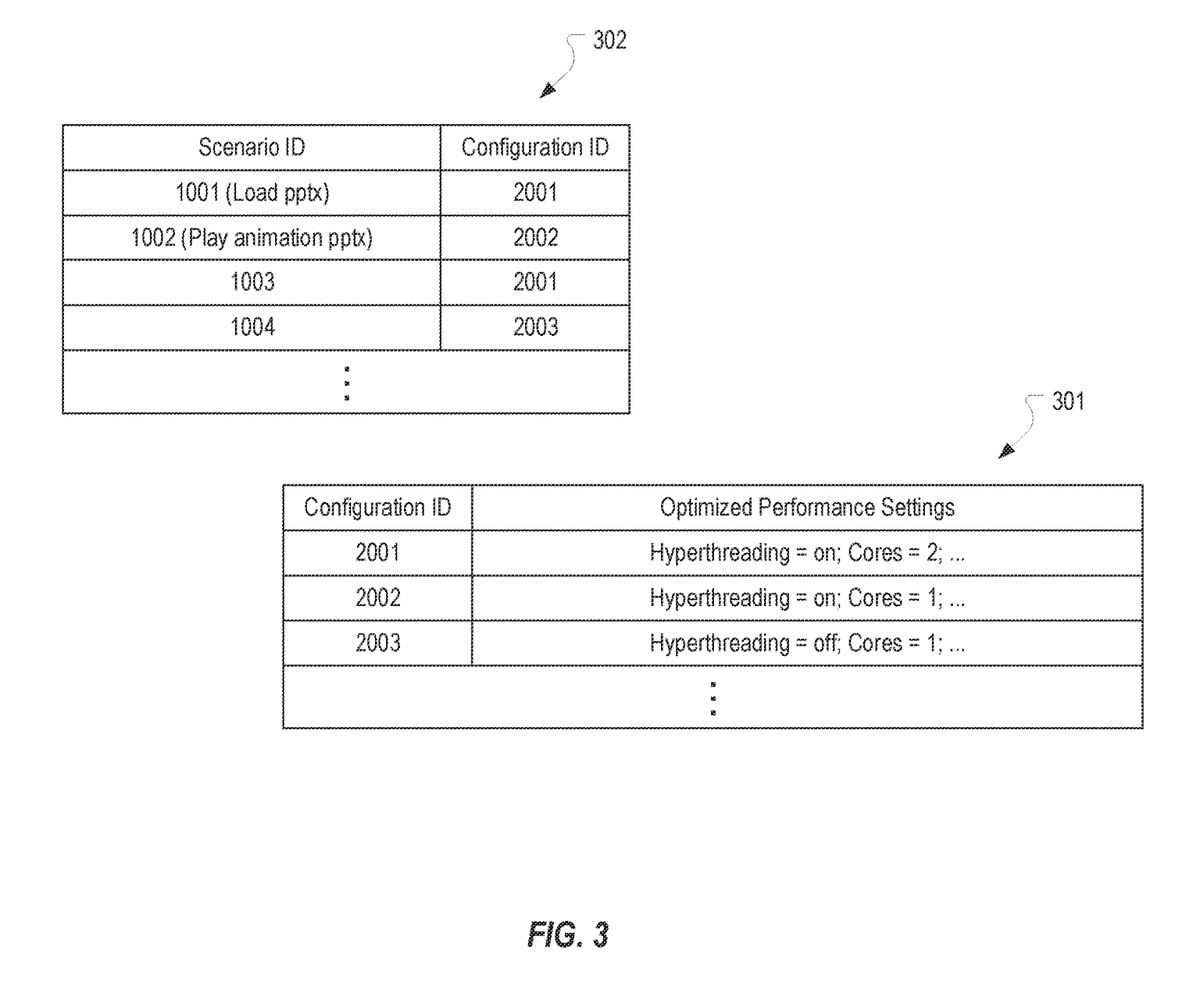
FIG. 3 provides an example of various data structures that could be used to implement one or more embodiments of the present invention.

FIG. 3 provides examples of data structures that management service 210 may maintain in configurations database 211 and use to select optimized performance settings for a detected scenario. As shown, scenarios can be represented with a scenario ID and a set of optimized performance settings can be represented by a configuration ID. Each set of optimized performance settings can be mapped to a configuration ID such as in table 301. Each scenario ID can be mapped to a particular configuration ID such as in table 302. This information can be compiled and defined in any suitable manner including those described below.

As an example, a "load pptx" scenario having a scenario ID of 1001 could represent a scenario where application 126 is PowerPoint and is being used to load a presentation in browser 150. This scenario could be mapped to configuration ID 2001 which defines, as optimized performance settings for browser 150, that hyperthreading should be turned on for application 126, that browser 150 should use two cores to run application 126, etc. As another example, a "play animation pptx" scenario having a scenario ID of 1002 could represent a scenario where PowerPoint is playing an animation in browser 150. This scenario could be mapped to configuration ID 2002 which defines, as optimized performance settings for browser 150, that hyperthreading should be turned on for application 126, that browser 150 should use one core to run application 126, etc.

For simplicity, the two examples given above represent scenarios where the optimized performance settings only pertain to browser 150 (i.e., optimized performance settings that service 213 may apply within browser 150). However, the optimized performance settings for a scenario could also include optimized performance settings to be applied by performance optimizer solution 200 and/or to be applied by service 213 within software container 132.

FIGS. 4A-4D provide an example of how management service 210 may optimize the performance of computing device 200 for a detected scenario in a mixed workload environment. For this example, it is assumed that management service 210 has been loaded on computing device 200 and has registered to be notified when containers and browsers are deployed on computing device 200. It is also assumed that software container 132 has been deployed to host application 124, that browser 150 has been deployed to host application 126 and that application 121 has been loaded natively. It is further assumed that management service 210 has established a communication channel with the instances of service 213 in software container 132 and browser 150 (e.g., via web service 220).

Figure 4A:
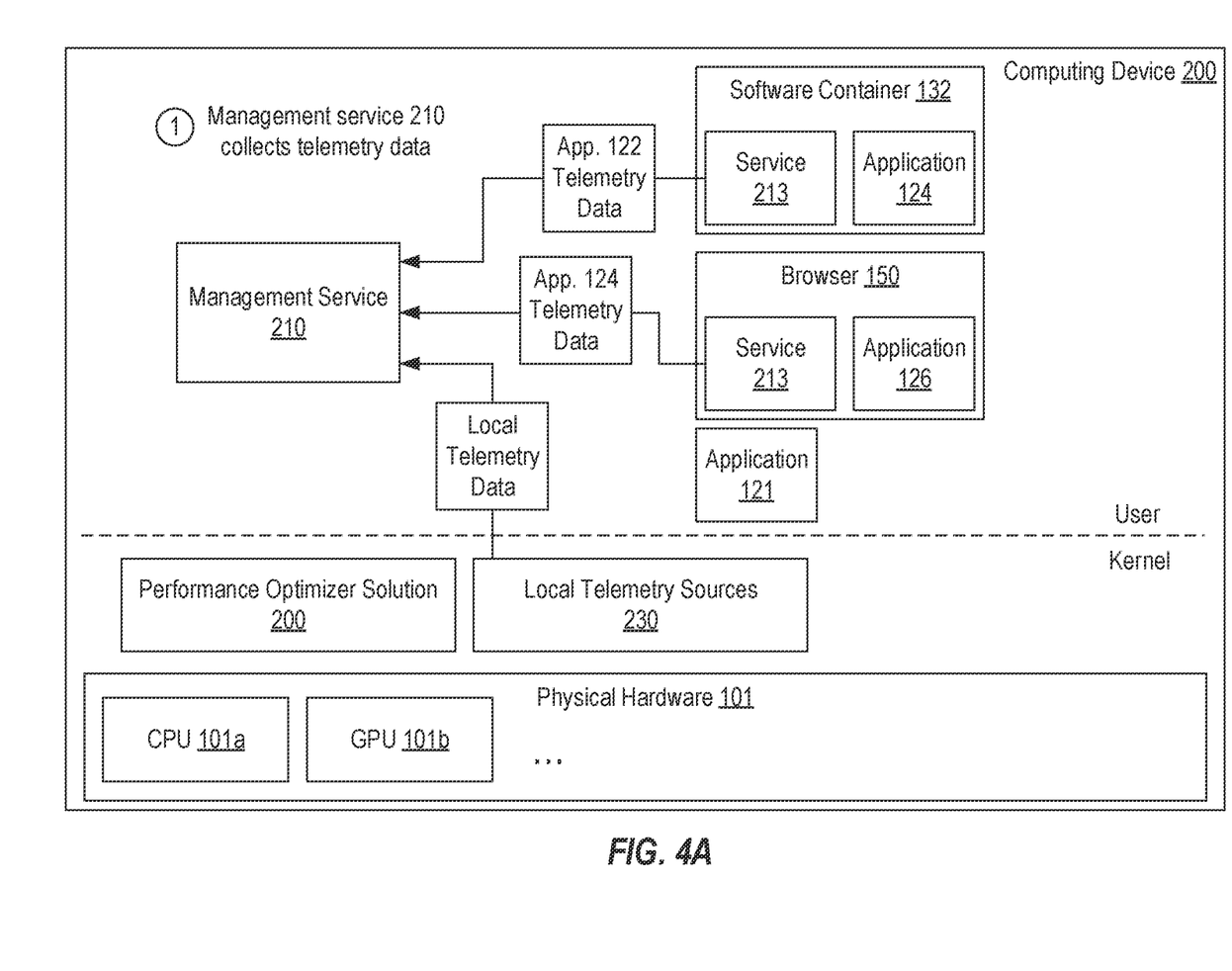
FIGS. 4A-4D provide an example of how optimized performance settings can be applied to a web application in response to detecting a particular scenario.

Turning to FIG. 4A, in step 1, management service 210 can collect telemetry data. For example, service 213 in software container 132 may leverage available APIs or tools within software container 132 to obtain telemetry data for application 124 and relay the telemetry data to management service 210. Likewise, service 213 in browser 150 may leverage available APIs or tools within browser 150 to obtain telemetry data for application 126 and relay the telemetry data to management service 210. Management service 210 may also obtain local telemetry data from local telemetry sources 230. In this context, "local telemetry data" represents telemetry data that is not obtained from an instance of service 213 running in a container or a browser.

Figure 4B:
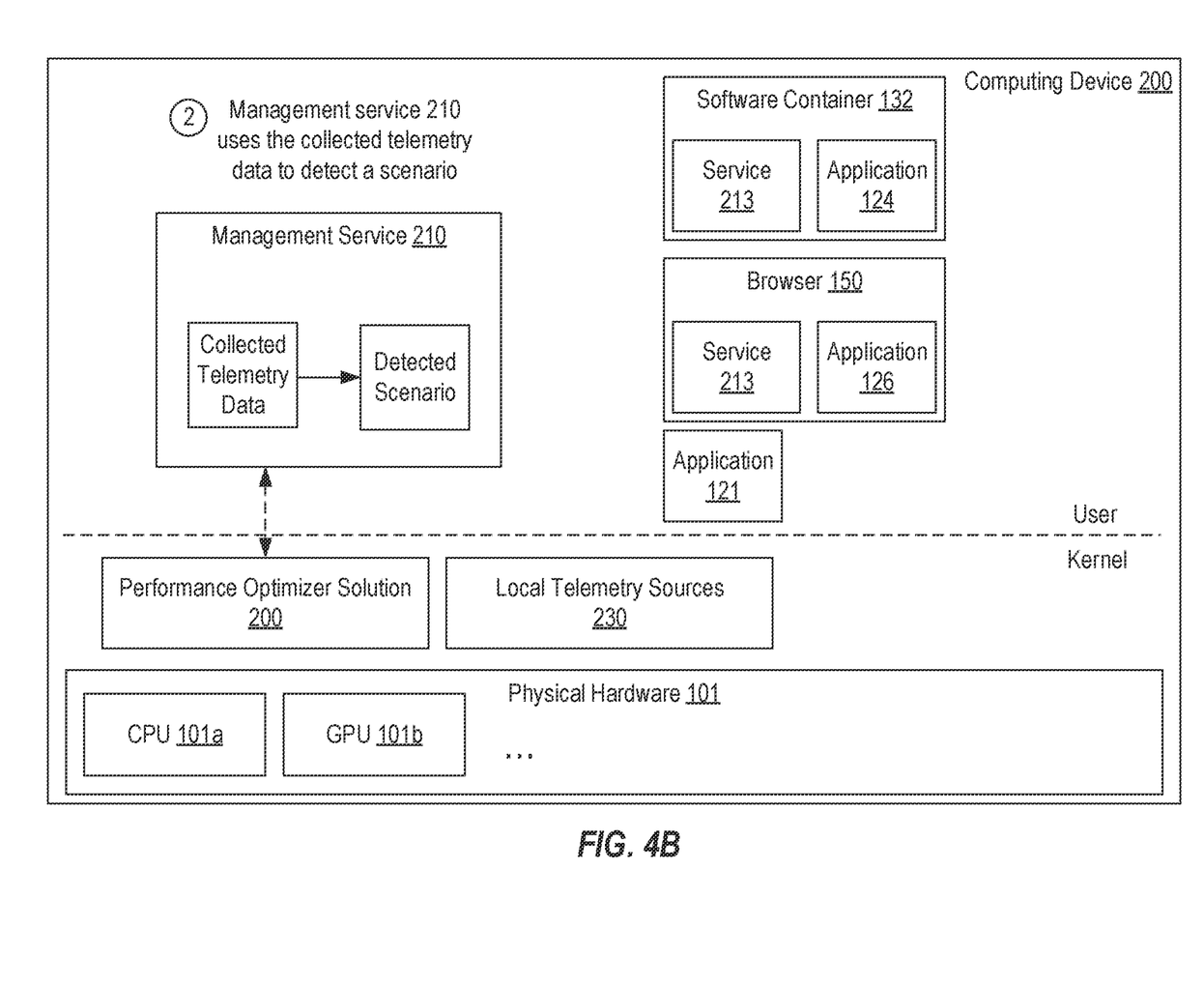

Turning to FIG. 4B, in step 2, management service 210 can process the collected telemetry data to detect a scenario. For purposes of this example, it is assumed that the detected scenario is scenario ID 1001 (i.e., that the collected telemetry data represents a scenario where PowerPoint is loading a presentation in browser 150). In some embodiments, management service 210 may interface with performance optimizer solution 200 to perform this detection of a scenario. As described in greater detail below, in some embodiments, management service 210 could use a machine learning model to predict scenarios from collected telemetry data. In such cases, management service 210 may provide an option for a user to train the machine learning model to detect desired scenarios and to identify optimized performance settings for such scenarios.

Figure 4C:
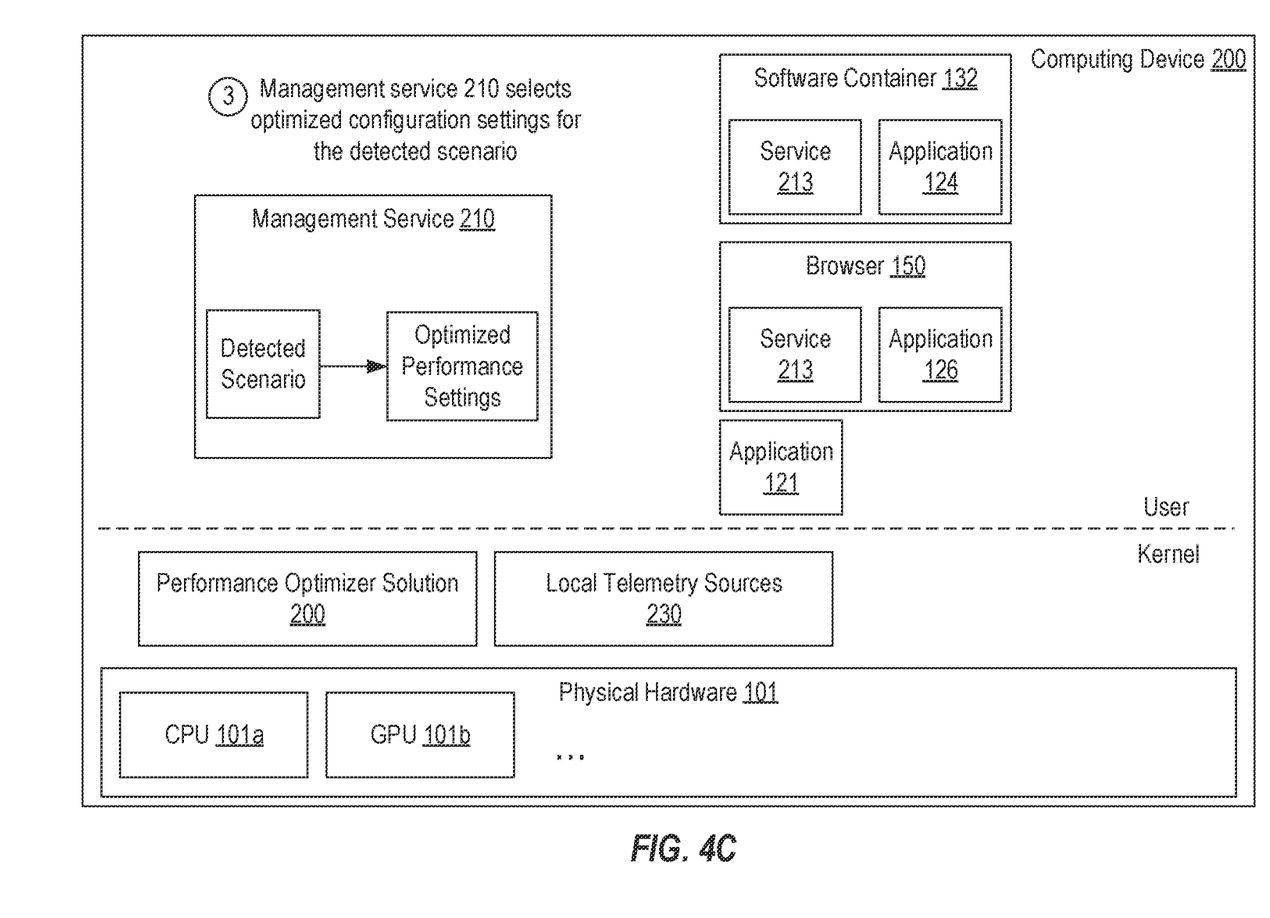

Turning to FIG. 4C, in step 3, management service 210 can select the optimized configuration settings for the detected scenario. For example, management service 210 could employ table 301 to select the configuration ID (2001) to which the scenario ID (1001) of the detected scenario is mapped and then use table 302 to select the optimized performance settings defined for the selected configuration ID (hyperthreading=on, cores=2; etc.).

Figure 4D:
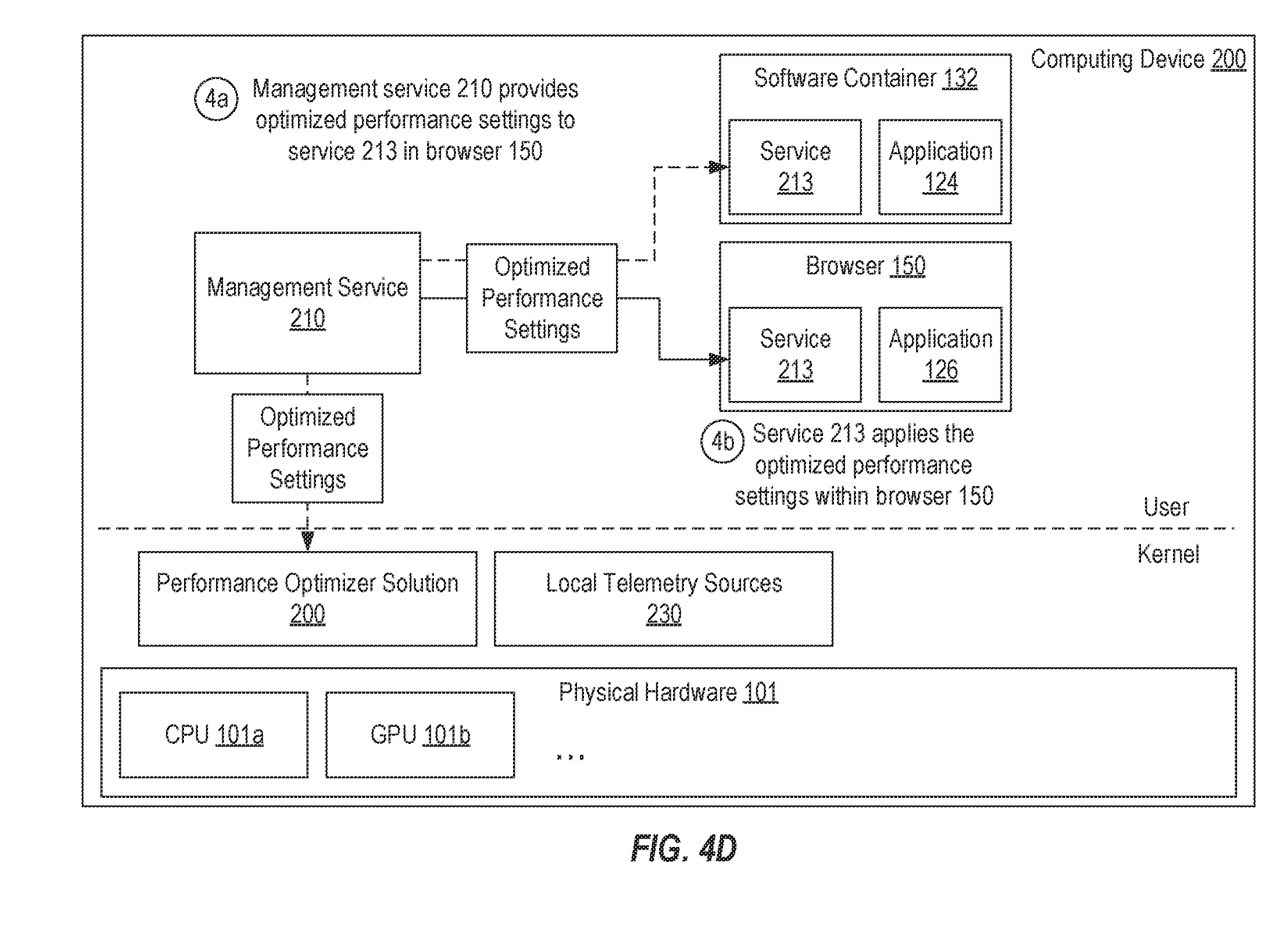

Turning to FIG. 4D, in step 4a, management service 210 can provide the optimized performance settings for the detected scenario to appropriate service(s) 213, which in this example is service 213 in browser 150. As indicated previously, in some embodiments, management service 210 may also provide optimized performance settings to service 213 in software container 132. Management service 210 may also or alternatively provide optimized performance settings to performance optimizer solution 200 to directly interface with the performance settings of CPU 101a, GPU 101b, etc.

In step 4b, service 213 in browser 150 (and/or in software container 132) can apply the optimized performance settings within browser 150 (and/or within software container 132) to thereby optimize the performance of application 126 (and/or of application 124). For example, service 213 could employ available APIs or other tools to cause browser 150 to configure CPU 101a to employ hyperthreading and two cores when executing application 126. Similarly, service 213 could employ available APIs or other tools to cause browser 150 to configure GPU 101b with the applicable optimized performance settings.

Figure 5:
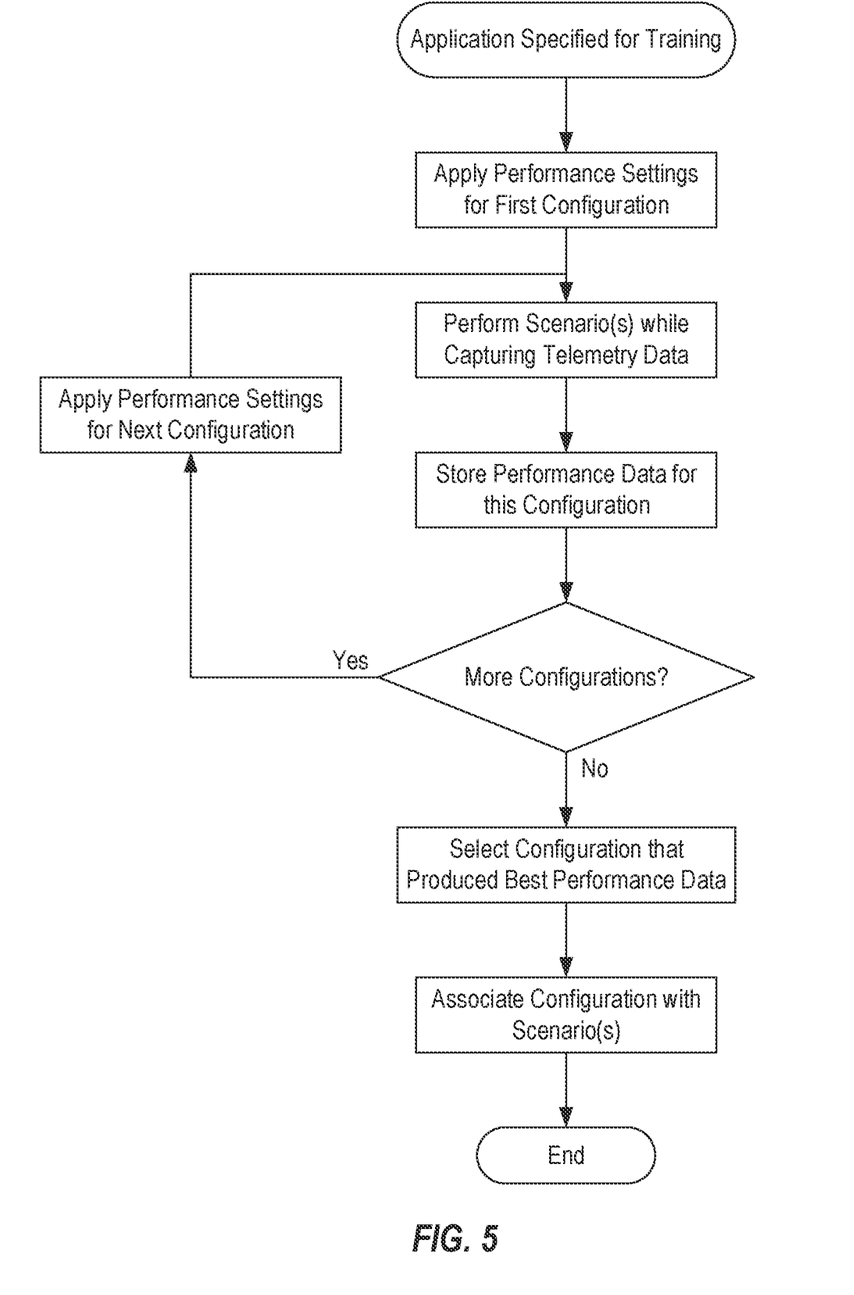
FIG. 5 provides an example of how optimized performance settings could be defined for a particular scenario.

FIG. 5 provides a flowchart of an example process by which management service 210 may determine and define the optimized performance settings for a particular scenario. In this example, it is assumed that management service 210 has defined multiple configurations (or sets of optimized performance settings) that could be selected and applied during training. For example, management service 210 could use each configuration defined in table 301. Alternatively, a user could manually specify configurations to be used in the process.

Initially, an application can be specified for training. For example, the web application version of PowerPoint could be identified for training. Additionally, management service 210 could apply the performance settings for a first configuration of the available configurations to the application. Then, the application can be run to perform one or more scenarios while capturing telemetry data. For example, PowerPoint could be loaded and then used to play an animation within browser 150. While these scenarios are performed, management service 210 could capture telemetry data in a similar manner as represented in FIG. 4A.

As or after capturing telemetry data while the scenario(s) are performed, management service 210 can store performance data for the configuration. In this context, "performance data" can be all or a subset of the collected telemetry data that defines how the application and/or computing device performed while each scenario was performed.

If there are more available configurations, management service 210 can apply the next configuration and repeat the process. Once the scenario(s) have been performed for all available configurations, management service 210 can evaluate the stored performance data to select the configuration that yielded the best performance for each scenario and can associate the configuration with the scenario (i.e., to define the configuration's performance settings as the optimized performance settings for the scenario). For example, management service 210 could add or update an entry in table 302. Additionally, in some embodiments, management service 210 could use the performance data stored during this process to subsequently detect the respective scenario. For example, management service 210 could use the performance data to train a machine learning model that is used to predict a scenario given a set of telemetry data.

In summary, embodiments of the present invention can be implemented on a computing device to enable the performance of web applications and/or containerized applications to be optimized when such applications are deployed in mixed workload environments. These optimizations can be applied both inside and outside the respective browser and/or container to thereby account for and correlate telemetry data for web applications, containerized application and native applications.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for optimizing performance of a computing device in a mixed workload environment, the method comprising:
   creating a mixed workload environment on the computing device by deploying a web application and a first instance of a service in a browser and by deploying a containerized application and a second instance of the service in a container;
   establishing, by a management service, a connection with the first instance of the service deployed in the browser and a connection with the second instance of the service deployed in the container;
   receiving, at the management service that executes outside of the browser and outside of the container, telemetry data pertaining to the web application from the first instance of the service and telemetry data pertaining to the containerized application from the second instance of the service;
   processing, by the management service, the telemetry data received from the first and second instances of the service to detect a scenario;
   selecting, by the management service, optimized performance settings for the scenario, the optimized performance settings including one or more of a hyperthreading setting, a number of cores setting and a process priority setting to be applied to a CPU of the computing device while the web application is executed in the browser and while the containerized application is executed in the container;
   providing, by the management service, the optimized performance settings to the first instance of the service that is hosted in the browser and to the second instance of the service that is hosted in the container;
   applying, by the first instance of the service, the optimized performance settings in the browser to thereby optimize performance of the web application for the scenario; and
   applying, by the second instance of the service, the optimized performance settings in the container to thereby optimize performance of the containerized application for the scenario.

2. The method of claim 1, further comprising:
   receiving additional telemetry data from a local telemetry source;

wherein processing the telemetry data received from the first and second instances of the service to detect the scenario comprises processing the additional telemetry data to detect the scenario.

3. The method of claim 1, wherein processing the telemetry data received from the first and second instances of the service to detect the scenario comprises applying a machine learning model to the telemetry data received from the first and second instances of the service to predict the scenario.

4. The method of claim 1, further comprising:
selecting additional optimized performance settings for the scenario; and
providing the additional optimized performance settings to a performance optimizer solution to thereby optimize performance of the computing device outside of the browser and outside of the container.

5. The method of claim 1, wherein the optimized performance settings for the scenario are defined by:
performing the scenario multiple times for multiple sets of performance settings to generate performance data for each of the multiple sets of performance settings; and
selecting a particular set of the multiple sets of performance settings as the optimized performance settings for the scenario, wherein the performance data for the particular set is better than the performance data for other sets of the multiple sets of performance settings.

6. The method of claim 1, wherein the scenario comprises loading of the web application.

7. The method of claim 1, wherein the scenario comprises a particular task that the web application performs.

8. The method of claim 1, wherein the optimized performance settings include one or more GPU settings.

9. One or more computer storage media storing computer executable instructions which when executed on a computing device implement a method for optimizing performance of a computing device in a mixed workload environment, the method comprising:
creating a mixed workload environment on the computing device by deploying a web application and a first instance of a service in a browser and by deploying a containerized application and a second instance of the service in a container;
establishing, by a management service, a connection with the first instance of the service deployed in the browser and a connection with the second instance of the service deployed in the container;
receiving, at the management service that executes outside of the browser and outside of the container, telemetry data pertaining to the web application from the first instance of the service and telemetry data pertaining to the containerized application from the second instance of the service;
processing, by the management service, the telemetry data received from the first and second instances of the service to detect a scenario;
selecting, by the management service, optimized performance settings for the scenario, the optimized performance settings including one or more of a hyperthreading setting, a number of cores setting and a process priority setting to be applied to a CPU of the computing device while the web application is executed in the browser and while the containerized application is executed in the container;
providing, by the management service, the optimized performance settings to the first instance of the service that is hosted in the browser and to the second instance of the service that is hosted in the container;

applying, by the first instance of the service, the optimized performance settings in the browser to thereby optimize performance of the web application for the scenario; and
applying, by the second instance of the service, the optimized performance settings in the container to thereby optimize performance of the containerized application for the scenario.

10. The computer storage media of claim 9, wherein the method further includes:
receiving additional telemetry data from a local telemetry source;
wherein processing the telemetry data received from the first and second instances of the service to detect the scenario comprises processing the additional telemetry data to detect the scenario.

11. The computer storage media of claim 9, wherein processing the telemetry data received from the first and second instances of the service to detect the scenario comprises applying a machine learning model to the telemetry data received from the first and second instances of the service to predict the scenario.

12. The computer storage media of claim 9, wherein the method further includes:
selecting additional optimized performance settings for the scenario; and
providing the additional optimized performance settings to a performance optimizer solution to thereby optimize performance of the computing device outside of the browser and outside of the container.

13. The computer storage media of claim 9, wherein the optimized performance settings for the scenario are defined by:
performing the scenario multiple times for multiple sets of performance settings to generate performance data for each of the multiple sets of performance settings; and
selecting a particular set of the multiple sets of performance settings as the optimized performance settings for the scenario, wherein the performance data for the particular set is better than the performance data for other sets of the multiple sets of performance settings.

14. The computer storage media of claim 13, wherein the scenario comprises a task that the web application performs.

15. The computer storage media of claim 13, wherein detecting the scenario comprises applying a machine learning model to the telemetry data received from the first and second instances of the service.

16. A computing device comprising:
a CPU; and
computer storage media storing computer executable instructions which when executed by the CPU implement a method for applying optimized performance settings in a mixed workload environment, the method comprising:
creating a mixed workload environment on the computing device by deploying a web application and a first instance of a service in a browser and by deploying a containerized application and a second instance of the service in a container;
establishing, by a management service, a connection with the first instance of the service deployed in the browser and a connection with the second instance of the service deployed in the container;
receiving, at the management service that executes outside of the browser and outside of the container, telemetry data pertaining to the web application from the first instance of the service and telemetry data pertaining to the containerized application from the second instance of the service;

processing, by the management service, the telemetry data received from the first and second instances of the service to detect a scenario;

selecting, by the management service, optimized performance settings for the scenario, the optimized performance settings including one or more of a hyperthreading setting, a number of cores setting and a process priority setting to be applied to a CPU of the computing device while the web application is executed in the browser and while the containerized application is executed in the container;

providing, by the management service, the optimized performance settings to the first instance of the service that is hosted in the browser and to the second instance of the service that is hosted in the container;

applying, by the first instance of the service, the optimized performance settings in the browser to thereby optimize performance of the web application for the scenario; and applying, by the second instance of the service, the optimized performance settings in the container to thereby optimize performance of the containerized application for the scenario.

17. The computing device of claim 16, wherein the method further comprises:

receiving additional telemetry data from a local telemetry source;

wherein processing the telemetry data received from the first and second instances of the service to detect the scenario comprises processing the additional telemetry data to detect the scenario.

\* \* \* \* \*